(12) United States Patent
Balamurugan et al.

(10) Patent No.: US 9,652,445 B2
(45) Date of Patent: May 16, 2017

(54) METHODS AND SYSTEMS FOR CREATING TASKS OF DIGITIZING ELECTRONIC DOCUMENT

(71) Applicant: Xerox Corporation, Norwalk, CT (US)

(72) Inventors: Chithralekha Balamurugan, Pondicherry (IN); Shourya Roy, Bangalore (IN); Sujit Gujar, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 253 days.

(21) Appl. No.: 13/904,319

(22) Filed: May 29, 2013

(65) Prior Publication Data

US 2014/0359418 A1 Dec. 4, 2014

(51) Int. Cl.
*G06F 17/24* (2006.01)

(52) U.S. Cl.
CPC .................................. *G06F 17/243* (2013.01)

(58) Field of Classification Search
CPC ..................................................... G06F 17/243
USPC ......................................................... 715/222
See application file for complete search history.

(56) References Cited

U.S. PATENT DOCUMENTS

| 7,734,999 B2 * | 6/2010 | Leung | G06F 17/243 715/222 |
| 9,032,545 B1 * | 5/2015 | Ho | G06F 21/60 726/28 |
| 9,092,749 B2 * | 7/2015 | Kern | G06Q 10/063112 |
| 2003/0221165 A1 * | 11/2003 | Young et al. | 715/505 |
| 2004/0128182 A1 * | 7/2004 | Pepoon | G06Q 40/08 705/4 |
| 2005/0165789 A1 * | 7/2005 | Minton | G06F 17/30905 |
| 2006/0218188 A1 * | 9/2006 | Duncan | G06Q 10/10 |
| 2007/0009158 A1 * | 1/2007 | Geva | G06Q 10/10 382/209 |
| 2007/0164927 A1 * | 7/2007 | Shoya | G06F 3/147 345/30 |
| 2008/0002234 A1 * | 1/2008 | Corso | H04N 1/00355 358/405 |
| 2009/0182580 A1 * | 7/2009 | Martin et al. | 705/3 |
| 2010/0057648 A1 * | 3/2010 | Dai | G06F 17/243 706/12 |

(Continued)

OTHER PUBLICATIONS

Ted Padova et al., PDF Forms Using Acrobat and LiveCycle Designer Bible, 2009, John Wiley and Sons, p. 459-460 and 526-530.*

(Continued)

*Primary Examiner* — Frank D Mills
(74) *Attorney, Agent, or Firm* — Jones Robb PLLC

(57) ABSTRACT

The disclosed embodiments illustrate methods and systems for creating one or more tasks of digitizing an electronic document. The electronic document comprises one or more fields. The method comprising receiving inputs to define one or more characteristics associated with each of the one or more fields. The one or more fields are categorized in one or more groups based on the one or more characteristics. Additionally, a task is created for each of the one or more categorized fields based on the one or more characteristics associated with each of the one or more categorized fields, wherein the task comprises at least a user interface for facilitating at least one remote worker to input a response for the task.

19 Claims, 12 Drawing Sheets

(56) References Cited

U.S. PATENT DOCUMENTS

| | | | |
|---|---|---|---|
| 2010/0246999 A1* | 9/2010 | Tillberg | G06K 9/00442 382/309 |
| 2013/0097479 A1* | 4/2013 | Zavaleta et al. | 715/222 |
| 2013/0268834 A1* | 10/2013 | Krane et al. | 715/222 |
| 2014/0108456 A1* | 4/2014 | Ramachandrula | G06F 17/30247 707/779 |

OTHER PUBLICATIONS

Padova et al., PDF Forms Using Acrobat and LiveCycle Designer Bible, John Wiley & Sons, 2009, p. 102, 140, 1080, 1107.*

Roy, Shourya, Chithralekha Balamurugan, and Sujit Gujar. "Sustainable employment in India by crowdsourcing enterprise tasks." In Proceedings of the 3rd ACM Symposium on Computing for Development, p. 16. ACM, 2013.*

Kern, Robert, Hans Thies, and Gerhard Satzger. "Statistical quality control for human-based electronic services." In International Conference on Service-Oriented Computing, pp. 243-257. Springer Berlin Heidelberg, 2010.*

U.S. Appl. No. 13/612,958, filed Sep. 13, 2012; Balamurugan et al; "Method and System for a Text Data Entry From an Electronic Document".

* cited by examiner

METHODS AND SYSTEMS FOR CREATING TASKS OF DIGITIZING ELECTRONIC DOCUMENT

TECHNICAL FIELD

The presently disclosed embodiments are related, in general, to crowdsourcing. More particularly, the presently disclosed embodiments are related to systems and methods for creating one or more tasks of digitizing an electronic document.

BACKGROUND

Digitizing a handwritten document involves capturing an image of the handwritten document to generate an electronic document using one or more image capturing devices such as a scanner and a camera. Thereafter, handwritten text in the electronic document may be identified by using an Optical Character Recognition (OCR) technique or Intelligent Character Recognition (ICR) techniques. As the quality of the handwritten text varies from one electronic document to another, the output of the OCR or the ICR technique may not be consistent and may be error prone.

With the advent of crowdsourcing, the digitization of the electronic document is being outsourced to a plurality of crowdworkers. In such a scenario, the electronic document (whole or in parts) is sent to crowdworker(s). The crowdworkers identify and inputs the identified handwritten content through a computing device thereby digitizing the electronic document.

The handwritten document may include confidential information pertaining to a person who has created or associated with the handwritten document. Some examples of the confidential information may include, but are not limited to, an address of the person, a phone number of the person, a social security number (SSN) of the person, and the like. Presenting such confidential information to the crowdworkers may pose privacy concerns as the crowdworkers may collect and misuse the confidential information present in the image of the handwritten document.

SUMMARY

According to embodiments illustrated herein there is provided a method implementable on a computing device for creating one or more tasks of digitizing an electronic document. The electronic document comprises one or more fields. The method comprising receiving inputs to define one or more characteristics associated with each of the one or more fields. The one or more characteristics comprise at least one of a syntactic type, a semantic type, a security type, a granularity type, a data entry type, a field data entry type, or a dependency type. The method further comprises categorizing the one or more fields in one or more groups based on the one or more characteristics. Additionally, the method further comprises creating a task for each of the one or more categorized fields based on the one or more characteristics associated with each of the one or more categorized fields. The task comprises at least a user interface for facilitating at least one remote worker to input a response for the task.

According to embodiments illustrated herein there is provided a system for creating one or more tasks of digitizing an electronic document. The electronic document comprises one or more fields. The system comprising a registration module configured to register the electronic document by receiving inputs to define one or more characteristics associated with each of the one or more fields. Further, the system comprises a categorization module configured to categorize the one or more fields in more or more groups based on the one or more characteristics. Additionally the system comprises a user interface generator configured to generate a user interface for each of the one or more categorized fields based on the one or more characteristics. A task manager configured to create a task for each of the one or more categorized fields based on the user interface and the one or more characteristics associated with each of the one or more categorized fields. The task comprises the user interface.

According to embodiments illustrated herein there is provided a computer program product comprising a set of instructions executable by a processor for creating one or more tasks of digitizing an electronic document. The electronic document comprises one or more fields. The set of instructions comprises a program instruction means for receiving inputs to define one or more characteristics associated with each of the one or more fields. Further, the set of instructions comprises a program instruction means for categorizing the one or more fields in more or more groups based on the one or more characteristics. Furthermore, the set of instructions comprises a program instruction means for creating a task for each of the one or more categorized fields based on the one or more characteristics associated with each of the one or more categorized fields. The task comprises at least a user interface.

According to embodiments illustrated herein there is provided a graphical user interface (GUI) facilitating generation of one or more tasks of digitizing an electronic document. The graphical user interface is displayable on an electronic device. The graphical user interface comprises a first option facilitating registration of the electronic document. A first portion is displayed on the GUI on selecting the first option. The first portion facilitates defining one or more characteristics of one or more fields in the electronic document. A second option facilitates validation of categorization of the one or more fields in one or more groups. A second portion is displayed on the GUI on selection the second option. The second portion displays categorization of the one or more fields in the one or more groups. A third option in the GUI facilitates validation of one or more task characteristics for each of the one or more groups. A fourth option facilitating viewing of one or more tasks that are generated based on the one or more task characteristics.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which:

FIGS. 9A, 9B, 9C, and 9D are snapshots of a first user interface in accordance with at least one embodiment.

DETAILED DESCRIPTION

Figure 1:
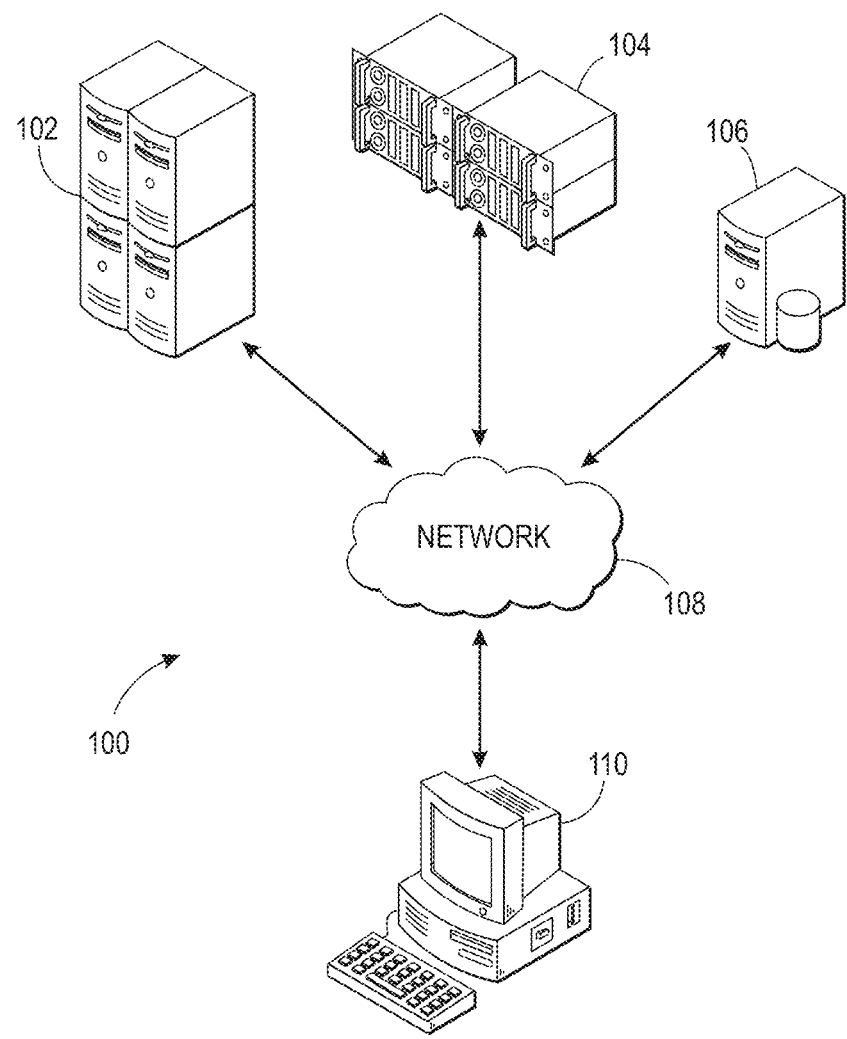
FIG. 1 illustrates a block diagram of a system environment in which various embodiment can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "task" refers to a piece of work, an activity, an action, a job, an instruction or an assignment to be performed. Tasks may necessitate the involvement of one or more crowdworkers. Examples of tasks include, but are not limited to, digitization of a document, generating a report, evaluating a document, conducting a survey, writing a code, extracting data, translating text, and the like.

"Crowdsourcing" refers to distributing tasks by soliciting the participation of loosely defined groups of individual crowdworkers. A group of crowdworkers may include, for example, individuals responding to a solicitation posted on a certain website such as, but is not limited to, Amazon Mechanical Turk and Crowd Flower.

A "crowdsourcing platform" refers to a business application, wherein a broad, loosely defined external group of people, communities, or organizations provides solutions as outputs for any specific business processes received by the application as input. In an embodiment, the business application may be hosted online on a web portal (e.g., the crowdsourcing platform servers). Various examples of the crowdsourcing platforms include, but are not limited to, Amazon Mechanical Turk or Crowd Flower.

A "crowdworker" refers to a workforce/worker(s) that may perform one or more tasks, which generate data that contributes to a defined result such as proofreading a part of a digital version of an ancient text or analyzing a quantum of a large volume of data. According to the present disclosure, the remote worker(s) includes, but is not limited to, a satellite center employee, a rural business process outsourcing (BPO) firm employee, a home-based employee, or an internet-based employee. Hereinafter, "crowdworker", "worker", "remote worker" "crowdsourced workforce", "crowdworker", and "crowd" may be interchangeably used.

An "image" refers to a collection of data, including image data in any format, retained in an electronic form. In an embodiment, the image may correspond to a pictorial representation of an object or a document.

An "electronic document" refers to a collection of data, including image data, in any format, retained in an electronic form. The electronic document can contain one or more texts, symbols, or the like. In an embodiment, the electronic document is obtained by scanning a corresponding physical document including but not limited to a handwritten document. The electronic document can be stored in various file formats, such as, JPG or JPEG, GIF, TIFF, PNG, BMP, RAW, PSD, PSP, PDF, and the like. Various examples of the electronic document include, but are not limited to, any application form, such as, an employment form, a medical insurance claim form, a driving license application, and the like.

A "field in an electronic document" refers to one or more portions in the electronic document. For example, a medical insurance form may include various fields such as, but are not limited to, name of a person, address, SSN, and undergoing treatments. In an embodiment, each field in the electronic document has one or more characteristics. In an embodiment, the one or more characteristics include, but are not limited to, a syntactic type, a semantic type, a security type, a granularity type, a data entry type, a field data entry type, or a dependency type.

A "syntactic type" of a field corresponds to the data type of the field. Some examples of the data type may include, but are not limited to, character, numeric, alphanumeric, combinations thereof, etc.

A "semantic type" of a field refers to meaning of a field in the electronic document. For example, fields such as name of a person, name of place, and name of a thing may correspond to "Name" semantic type as information in such fields usually corresponds to name. Similarly, ID, mobile number, fax, code, marks obtained may correspond to "Number" semantic type as information in such fields usually corresponds to a number. Some other examples of the semantic type may include, but are not limited to, Date, measured value, currency, address, door number, city, state, zip code, email, country, gender, title, language, etc.

A "granularity type" of a field is indicative of whether the field is combination of one or more fields. In an embodiment, a field that is a combination of one or more fields is referred as a "composite field". For example, an address of a person may include fields such as, but not limited to, door number, street, city, state, zip code, and country details. Therefore, the address of a person is a composite field. In an embodiment, a field that is not a combination of the one or more fields is referred as an "atomic field". For example, an SSN number of person is an atomic field.

A "security type" of field is indicative of a level of confidentiality associated with a field. In an embodiment, the levels of confidentiality includes, but are not limited to, individually confidential, confidential with respect to other fields, restricted, and general. For example, SSN number of a person is individually confidential. In another example, street name in an address field is confidential with respect to other fields such as country details, zip code, and state name. In yet another example, fields such as city and country may qualify under general category.

A "data entry type" of a field refers one or more methods by which a crowdworker can input data. In an embodiment, some examples of data entry type may include, but are not limited to, free text, multiple choice, selection-single, selection-multiple.

A "dependency type" of a field is indicative of dependency of the field in an electronic document on other one or more fields in the electronic document. Some examples of the dependency type of the field include, but are not limited to, a calculation dependency, a filling dependency, a validation dependency, and the like.

A "calculation dependency" refers to a mathematical dependency of data in a field on a mathematical relation between data in other fields in the electronic document. For example, field 'c' is obtained by computing sum of fields 'a' and 'b'.

A "filling dependency" refers to a check whether data in a field has to be filled based on the data in other fields in the electronic document. For example, if marital status has been marked as "single", corresponding spouse name is not required to be filled.

A "validation dependency" refers to data consistency in the one or more fields in the electronic document. For example, data in "Zip code" field should correspond to "City name" field.

A "field data entry type" of a field is indicative of whether data entry of the field is mandatory.

A "location identifier" refers to information contained or derived from one or more locations in an electronic document. In an embodiment, the descriptors correspond to location of the one or more fields in the electronic document. In an embodiment, the location identifier may correspond to X-Y coordinates of the one or more fields in the electronic document.

FIG. 1 illustrates a block diagram of a system environment 100 in which various embodiments can be implemented. The system environment 100 includes a crowdsourcing platform server 102, an application server 104, a database server 106, a network 108, and a computing device 110.

The crowdsourcing platform server 102 is configured to host one or more crowdsourcing platforms. One or more crowdworkers are registered with the crowdsourcing platform. Further, the crowdsourcing platform offers one or more tasks to the one or more crowdworkers. In an embodiment, the crowdsourcing platform presents an application interface (API) to the one or more crowdworkers through a web based interface or a client application. The one or more crowdworkers may access the one or more tasks through the web based interface or the client application. Further, the one or more crowdworkers may submit a final work product/response to the crowdsourcing platform through the API. The crowdsourcing platform may validate the final work product for quality checks. In an embodiment, the crowdsourcing platform server 102 may be realized through an application server such as but not limited to, Java application server, .NET framework, and Base4 application server.

The application server 104 creates the one or more tasks of digitizing an electronic document. A requester registers an electronic document on the application server 104. In an embodiment, the registration of the electronic document involves defining one or more characteristics associated with each of one or more fields in the electronic document. The one or more characteristics include at least one of a syntactic type, a semantic type, a security type, a granularity type, a data entry type, a field data entry type, or a dependency type. In an embodiment, the application server 104 presents a first user interface to the requestor through which the requestor defines the one or more characteristics. In an alternate embodiment, the application server 104 presents the first user interface to a requestor. Thereafter, the application server 104 categorizes each of the one or more fields in one or more groups based on the one or more characteristics associated with the each of the one or more fields. In an embodiment, a set of fields in a group have same/similar characteristics. The application server 104 defines one or more task characteristics for each of the one or more groups based on the same/similar characteristics. The application server 104 receives one or more filled electronic documents (filled in same template as the registered electronic document). The application server 104 extracts a portion from each of the one or more filled electronic documents corresponding to the one or more fields.

Thereafter, the application server 104 utilizes the one or more task characteristics and the portion (corresponding to the set of fields in the group) to generate a second user interface for each field in the set of fields in the group. In an embodiment, the second user interface facilitates the one or more crowdworkers to input data corresponding to the handwritten text in the set of fields. In an embodiment, the second user interface includes the extracted portion of the electronic document. The application server 104 generates the one or more tasks based on the second user interface and the one or more task characteristics. Further, the application server 104 uploads the one or more tasks on the crowdsourcing platform server 102. In an embodiment, the crowdsourcing platform server 102 distributes the one or more tasks to the one or more crowdworkers based on the categorization. Some examples of the application server 104 may include, but not limited to, Java application server, .NET framework, and Base4 application server.

A person having ordinary skill in the art would understand that the scope of the disclosure is not limited to illustrating the application server 104 as a separate entity. In an embodiment, the application server 104 may be implementable on/integrated with the crowdsourcing platform server 102.

The database server 106 stores information associated with the one or more crowdworkers. Further, the database server 106 stores the registered electronic document. Furthermore, the database server 106 stores the one or more filled electronic documents. In an embodiment, the database server 106 may receive a query from at least one of the crowdsourcing platform server 102 or the application server 104 to extract the one or more filled electronic documents and/or the registered electronic document. The database server 106 may be realized through various technologies, such as, but not limited to, Microsoft® SQL server, Oracle, and My SQL. In an embodiment, the crowdsourcing platform server 102 and/or the application server 104 may connect to the database server 106 using one or more protocols such as, but not limited to, ODBC protocol and JDBC protocol.

A person having ordinary skills in the art would understand that the scope of the disclosure is not limited to the database server 106 as a separate entity. In an embodiment, the functionalities of database server 106 can be integrated into the crowdsourcing platform server 102 and/or the application server 104.

The network 108 corresponds to a medium through which content and messages flow between various devices of the system environment 100 (e.g. the crowdsourcing platform server 102, the application server 104, the database server 106, and the computing device 110). Examples of the network 108 may include, but are not limited to, a Wireless Fidelity (Wi-Fi) network, a Wireless Area Network (WAN), a Local Area Network (LAN) or a Metropolitan Area Network (MAN). Various devices in the system environment 100 can connect to the network 108 in accordance with the various wired and wireless communication protocols such as Transmission Control Protocol and Internet Protocol (TCP/IP), User Datagram Protocol (UDP), and 2G, 3G, or 4G communication protocols.

The computing device 110 presents the API (received from the crowdsourcing platform) to a crowdworker. In an embodiment, the API is a web interface facilitated by the crowdsourcing platform. The crowdworker receives a task from the crowdsourcing platform through the API. Further, the crowdworker submits the final work product/response through the API on the computing device 110. In an embodiment, the task (presented through the API) includes the second user interface that enables the crowdworker to enter data corresponding to a field in the electronic document. Some of the examples of the computing device 110 include a personal computer, a laptop, a PDA, a mobile device, a tablet, or any device that has the capability to display the user interface to the crowdworker.

Figure 2:
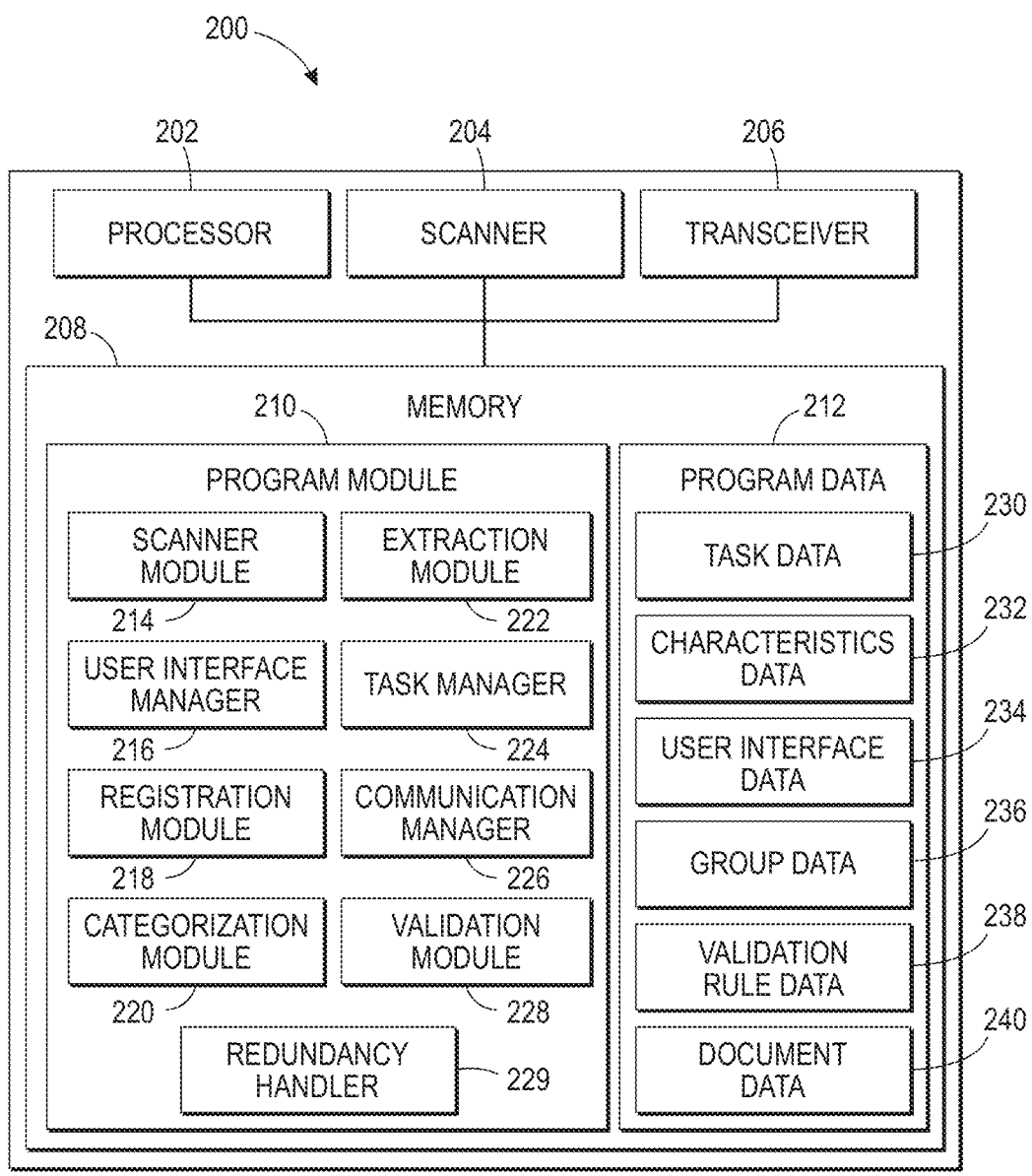
FIG. 2 illustrates a block diagram of a system for creating one or more tasks, in accordance with at least one embodiment.

FIG. 2 illustrates a block diagram of a system 200 for creating one or more tasks, in accordance with at least one embodiment. The system 200 includes a processor 202, a scanner 204, a transceiver 206, and a memory 208. In an embodiment, the system 200 may correspond to the crowdsourcing platform server 102 or the application server 104. For the purpose of ongoing description, the system 200 is considered as the crowdsourcing platform server 102. However, the scope of the disclosure should not be limited to the system 200 as the crowdsourcing platform server 102. The system 200 can also be realized as the application server 104.

The processor 202 is coupled to the scanner 204, the transceiver 206, and the memory 208. The processor 202 executes a set of instructions stored in the memory 208 to perform a predetermined operation on the system 200. The processor 202 can be realized through a number of processor technologies known in the art. Examples of the processor 202 may include, but are not limited to, X86 processor, RISC processor, ASIC processor, CISC processor, ARM processor, or any other processor.

The scanner 204 is an optical device that scans a document to generate an electronic document. In an embodiment, the scanner 204 may utilize various image capturing techniques such as, but are not limited to, a charge-coupled device (CCD) and a Contact Image Sensor (CIS), to scan the document. In an embodiment, the scanner 204 implements a linear scanning technique. In another embodiment, the scanner 204 implements a two-dimensional scanning technique.

The transceiver 206 transmits and receives messages and data to/from various components of the system environment 100 (e.g., the computing device 110, the application server 104, and the database server 106). Examples of the transceiver 206 may include, but are not limited to, an antenna, an Ethernet port, a USB port or any other port that can be configured to receive and transmit data. The transceiver 206 transmits and receives data/messages in accordance with the various communication protocols, such as, TCP/IP, UDP, and 2G, 3G, or 4G communication protocols.

The memory 208 stores a set of instructions and data. Some of the commonly known memory implementations include, but are not limited to, a random access memory (RAM), a read only memory (ROM), a hard disk drive (HDD), and a secure digital (SD) card. Further, the memory 208 includes a program module 210 and a program data 212. The program module 210 includes a set of instructions that is executable by the processor 202 to perform specific operations. The program module 210 further includes a scanner module 214, a user interface manager 216, a registration module 218, a categorization module 220, an extraction module 222, a task manager 224, a communication manager 226, a validation module 228, and a redundancy handler 229. It is apparent to a person having ordinary skills in the art that the set of instructions stored in the memory 208 enables the hardware of the system 200 to perform the predetermined operation.

The program data 212 includes a task data 230, a characteristics data 232, a user interface data 234, a group data 236, a validation rule data 238, and a document data 240.

The scanner module 214 facilitates the scanner 204 to scan one or more handwritten documents to generate the one or more filled electronic documents. Further, the scanner module 214 facilitates the scanner 204 to scan an unfilled document to generate the electronic document. The scanner module 214 includes a driver module that enables the scanner 204 to scan the one or more handwritten documents and unfilled document. Further, the scanner module 214 stores the one or more filled electronic documents and the electronic document as the document data 240.

A person having ordinary skills in the art would understand that the scope of the disclosure is not limited to creation of the electronic document by scanning the unfilled document. In an embodiment, the scanner module 214 generates the electronic document using a template, or a filled document.

The user interface manager 216 generates the first user interface and the second user interface. In an embodiment, the user interface manager 216 utilizes the user interface data 234 to generate the first user interface. In an embodiment, the first user interface facilitates the requestor of the system 200 to register the electronic document. The first user interface is described later in conjunction with FIGS. 9A, 9B, 9C, and 9D. Additionally, the user interface manager 216 utilizes the characteristics data 232 to generate the second user interface. In an embodiment, the second user interface facilitates the one or more crowdworker to enter data corresponding to a field in the electronic document. Further, the generation of the second user interface is described later in conjunction with FIG. 4.

The registration module 218 extracts the electronic document from the document data 240. Thereafter, the registration module 218 receives inputs from the requestor through the first user interface to define identifier for each of the one or more fields in the electronic document. In an embodiment, the identifier corresponds to name of the one or more fields. Additionally, the registration module 218 receives the input from the requestor to define one or more location identifiers for each of the one or more fields. In an embodiment, the requestor tags the one or more fields in the electronic document. Thereafter, the registration module 218 determines the one or more location identifiers of the tags using one or more techniques such as, but is not limited to, Cartesian coordinate system, and pixel map. The registration module 218 maintains an index in which the one or more location identifiers are stored along with the identifier (i.e., name of the one or more field). In an embodiment, the index may correspond to, but not limited to, an xml file. Thereafter, the requestor provides input through the second user interface to define the one or more characteristics of each of the one or more fields. The registration module 218 stores the one or more characteristics in the index. Further, the registration module 218 stores the index as the characteristics data 232.

The categorization module 220 categorizes the one or more fields in one or more groups. Firstly, the categorization module 220 categorizes each of the one or more fields in one or more security groups based on the security type and the dependency type of the one or more fields. In an embodiment, the one or more security groups include a set of fields. Thereafter, the categorization module 220 categorizes each field in the set of fields in the one or more groups based on the semantic type of the each field in the set of fields. In an embodiment, each field in the set of fields has same/similar characteristics. In an embodiment, the categorization module 220 stores the same/similar characteristics as the group data 236. The categorization of the one or more fields is described later in conjunction with FIG. 5, FIG. 6, and FIG. 7.

The extraction module 222 extracts the one or more filled electronic documents from the document data 240. Further, the extraction module 222 determines the one or more location identifiers from the characteristics data 232. Based on the one or more location identifiers, the extraction module 222 extracts one or more portions defined by the one or more location identifiers from each of the one or more filled electronic documents. In an embodiment, the extraction module 222 crops out the one or more portions from the one or more filled electronic documents. In an embodiment, the one or more portions include handwritten text.

The task manager 224 determines same/similar characteristics for each of the one or more groups from the group data 236. Based on the same/similar characteristics, the task manager 224 defines one or more task characteristics for each of the one or more groups. The task manager 224 stores the one or more task characteristics as the task data 230. Additionally, the task manager 224 generates one or more tasks for each of the one or more groups based on the one or more task characteristics and categorized portions. In an embodiment, the one or more tasks include the one or more portions and the second user interface. The task manager 224 stores the one or more tasks as the task data 230.

The communication manager 226 transmits the API to the computing device 110 through the transceiver 206. In an embodiment, the communication manager 226 receives the user input as a response for the task through the API. The communication manager 226 includes various protocol stacks such as, but not limited to, TCP/IP, UDP, and 2G, 3G, or 4G communication protocols. The communication manager 226 transmits and receives the messages/data (e.g., images) through the transceiver 206 in accordance with such protocol stacks.

The validation module 228 generates one or more validation rules for the task based on the one or more same/similar characteristics associated with each of the one or more groups. In an embodiment, the one or more validation rules may correspond to data entry validation scripts. The validation module 228 utilizes the one or more validation rules to validate the response received for the task from the crowdworker. In an embodiment, the one or more validation rules are included in the one or more task characteristics. The generation of the one or more validation rules is described later in conjunction with FIG. 4. Further, the validation module 228 stores the one or more validation rules as the validation rule data 238.

The redundancy handler 229 defines a degree of redundancy and one or more correctness resolution rules for each of the one or more fields based on security type associated with the one or more fields and the input method type (second user interface) generated by the user interface manager 216. The operation of the redundancy handler 229 is described later in conjunction with FIG. 4.

Figure 3A:
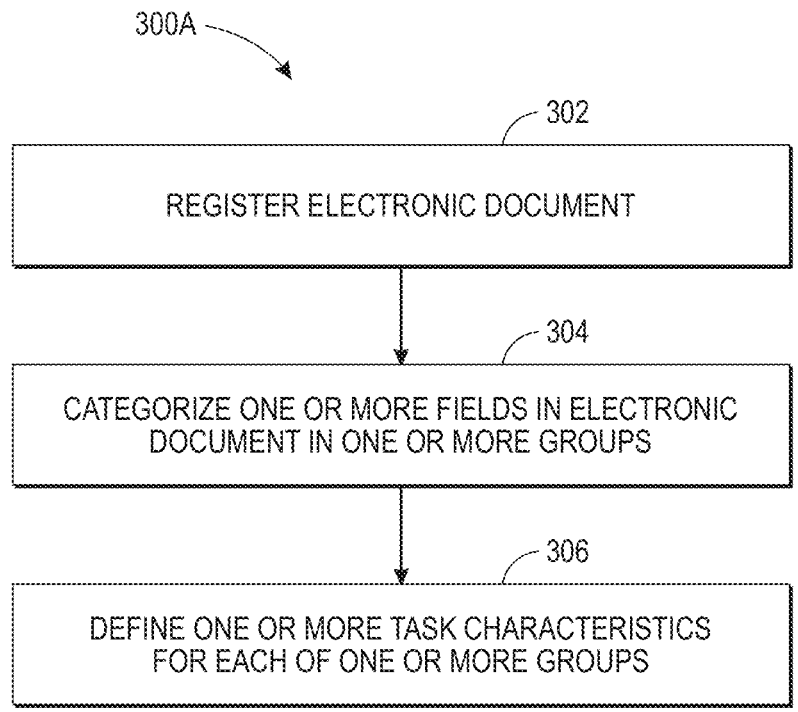
FIG. 3A is flowchart illustrating a method for registering an electronic document, in accordance with at least one embodiment.

FIG. 3A is a flowchart 300a illustrating a method for registering an electronic document, in accordance with at least one embodiment. The flowchart 300 is described in conjunction with FIG. 1 and FIG. 2.

At step 302, the electronic document is registered. In an embodiment, the registration module 218 registers the electronic document. Prior to registering the electronic document, the scanner module 214 facilitates the scanner 204 to scan an unfilled document to generate the electronic document. In another embodiment, the registration module 218 receives the electronic document from the database server 106. The electronic document includes the one or more fields.

The user interface manager 216 presents a first user interface to the requestor associated with the electronic document. The requestor utilizes the first user interface to define an identifier for each of the one or more fields present in the electronic document. In an embodiment, the identifier corresponds to name of the field. Further, the requestor provides input to the first user interface to define the one or more location identifier associated with the one or more fields. Furthermore, the requestor defines the one or more characteristics associated with each of the one or more fields. The registration module 218 collates the information (e.g., definition of the identifier, one or more location identifiers, and the one or more characteristics) received from the requestor to generate an index file. The registration module 218 stores the index as the characteristics data 232. An example index file has been illustrated below:

TABLE 1

Index illustrating information associated with the registration of electronic document.

| Field in electronic document | Location identifiers | Name of identifier | Characteristics |
|---|---|---|---|
| Name | (101, 35-120, 35); (101, 40-120, 40) | Name | Syntactic Type: Character<br>Semantic type: Name<br>Granularity: Atomic<br>Security: General<br>Data Entry Type: Free Text<br>Dependency Type: None<br>Field Data requirement type: Mandatory |
| Address | (150, 50-160, 50); (150, 65-160, 65) | Address | Syntactic Type: Character<br>Semantic type: Address |

TABLE 1-continued

Index illustrating information associated with the registration of electronic document.

| Field in electronic document | Location identifiers | Name of identifier | Characteristics |
|---|---|---|---|
| | | | Granularity: Composite<br>Security: Confidential with respect to other fields<br>Data Entry Type: Free Text<br>Dependency Type: depend on city, country<br>Field Data requirement type: Mandatory |

From Table 1, it can be observed that for the field "Name" in the electronic document, the requestor has defined location identifier as "(101, 35-120, 35); (101, 40-120, 40)" (i.e., by marking/highlighting areas). Further, the requestor has defined the identifier as "Name". The one or more characteristics associated with the field "Name" in the electronic document includes:

Syntactic Type: Character;
Semantic type: Name;
Granularity: Atomic;
Security: General;
Data Entry Type: Free Text;
Dependency Type None; and
Field Data requirement type: Mandatory.

The syntactic type "Character" signifies that the data type of the field is character (i.e., A-Z and a-z). The semantic type "Name" signifies that the information in the field may correspond to name of a person, thing, or place. Granularity "Atomic" signifies that the "Name" field is not a collection of fields. Security "General" signifies that the information in the field is generic. Data entry type "Free text" signifies that a crowdworker will be presented with a text box in which the crowdworker can enter data freely without any word limit. Dependency "None" signifies that the field "Name" does not depend on any other field present in the electronic document. Finally, field data requirement type "Mandatory" signifies that it is necessary for the crowdworker to fill this field.

Similarly, for the "Address" field following are the one or more characteristics:

Syntactic Type: Character;
Semantic type: Address;
Granularity: Composite;
Security: Confidential with respect to other fields;
Data Entry Type: Free Text;
Dependency Type Depend on city, country; and
Field Data requirement type: Mandatory.

For the "Address" field Granularity "Composite" signifies that the "Address" field is composed of one or more fields such as "Country name" and "City name". Security "Confidential with respect to other fields" signifies that address along with other fields in the electronic document may reveal confidential information. For example, "Street name" along with "City name" may reveal address of a person. Dependency "Depend on city, country" signifies that the field "Address" depends on the "Country name" and "City name".

For example, an electronic document includes a "Name" field, an "SSN" field, a "Street name" field and a "City name" field. As the "Street name" and the "City name" together may reveal the address of a person, the requestor may assign "Confidential with respect to other fields" security type to the "Street name" field. Similarly, the "SSN" field may reveal information associated with the person, the requestor may assign "Individually confidential" security type to the "SSN" field.

At step 304, each of the one or more fields in the electronic document is categorized in the one or more groups. In an embodiment, the categorization module 220 categorizes the one or more fields in the one or more groups based on the one or more characteristics associated with each of the one or more fields. Firstly, the one or more fields are categorized in one or more security groups based on the security type and the dependency type of the one or more fields. In an embodiment, each of the one or more security groups has a set of fields. Thereafter, the categorization module 220 categorizes each field in the set of fields in one or more groups based on the semantic type associated with each field in the set of fields. In an embodiment, one or more categorized fields in the one or more groups have same/similar characteristics. In an embodiment, the categorization module 220 stores the one or more same/similar characteristics as the group data 236. Following table illustrates an example categorization of the one or more fields in the one or more groups:

TABLE 2

Categorization of the one or more fields in the electronic document

| Security Groups | Groups | Fields | Same/similar characteristics |
|---|---|---|---|
| General | Group-1 | Patient Name<br>Insured Name<br>Physician Name | Security type: general<br>Syntactic type: character<br>Data entry type: Free text |
| | Group-2 | Patient's DOB<br>Insured Date<br>Nominee's DOB | Security type: general<br>Syntactic type: numeric<br>Data entry type: Multiple choice |
| Confidential | Group-3 | SSN<br>Physician NPI number | Security type: Confidential<br>Syntactic type: Numeric<br>Data entry type: Free text |
| | Group-4 | Date of hospitalization<br>Date of service | Security type: Confidential<br>Syntactic type: numeric<br>Data entry type: Multiple choice |

From Table 2 it can be observed that "General" security group includes "Group-1" and "Group-2". "Group-1" includes fields having following same/similar characteristics:

Security type: general;
Semantic type: character; and
Data entry type: Free text.

Similarly, "Confidential" security group includes "Group-3" and "Group-4". "Group-3" includes fields having following same/similar characteristics:

Security type: Confidential;
Semantic type: Numeric; and
Data entry type: Free text.

The categorization of the one or more fields is described later in conjunction with FIG. 5, FIG. 6, and FIG. 7.

At step 306, one or more task characteristics are defined for each of the one or more groups based on the one or more same/similar characteristics associated with the one or more groups. In an embodiment, the task manager 224 generates the one or more task characteristics. In an embodiment, the one or more task characteristics include a type of second user interface, one or more validation rules, on screen instructions. In an embodiment, the task manager 224 stores the one or more task characteristics as the task data 230. In an embodiment, the one or more task characteristics determine the characteristics of one or more tasks that will be created for a group. For example, for "Group-1" (refer table 2) the second user interface is a "Text box", the one or more tasks created for the "Group-1" will include the "Text box". The generation of the one or more task characteristics is described later in conjunction with FIG. 4.

Figure 3B:
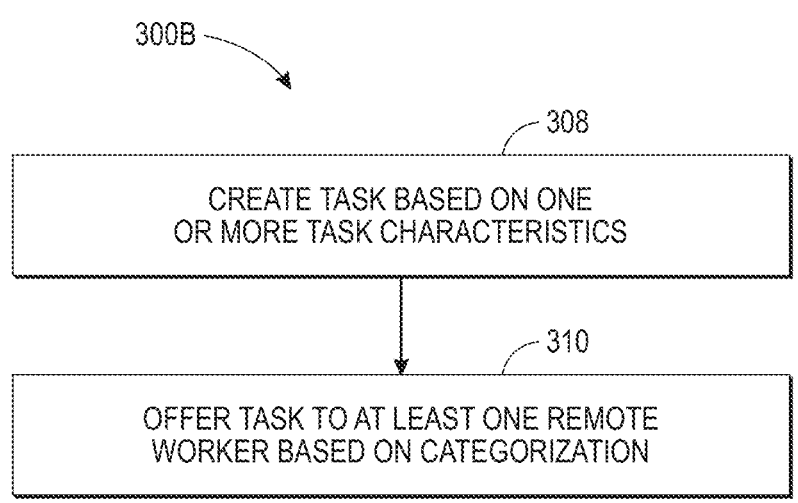
FIG. 3B is a flowchart illustrating a method for generating one or more tasks, in accordance with at least one embodiment.

FIG. 3B is flowchart 300b illustrating a method for generating one or more tasks, in accordance with at least one embodiment.

Post generation of the one or more task characteristics, the system 200 receives one or more filled electronic forms from the requestor for digitization. In an embodiment, the one or more filled electronic forms are filled in the same template as that of the registered electronic document. In another embodiment, the system 200 receives the one or more filled electronic forms from the database server 106. The extraction module 222 determines the one or more location identifiers from the characteristics data 232. Thereafter, the extraction module 222 extracts the one or more portions from each of the one or more filled electronic documents corresponding to the one or more location identifiers.

For example, the extraction module 222 extracts a portion corresponding to coordinates (101, 35-120, 35); (101, 40-120, 40) from each of the one or more filled electronic documents. In an embodiment, the extracted portion corresponds to "Name" field in each of the one or more filled electronic documents. Thereafter, each of the one or more extracted portions is categorized in the one or more groups as per the categorization of the one or more respective fields corresponding to the one or more portions.

At step 308, a task is created for each of the categorized portions based on the one or more task characteristics associated with each of the one or more groups. In an embodiment, the task manager 224 creates the task. The task manager 224 determines the type second user interface from the one or more task characteristics associated with a group from the one or more groups. Further, the task manager 224 determines the on screen instruction from the one or more task characteristics associated with the group. Thereafter, the task manager 224 associates the one to more portions categorized in the group with the second user interface and the on screen instructions to create one or more tasks. Similarly, the task manager 224 creates the one or more tasks for each of the one or more groups.

At step 310, the one or more tasks are offered to at least one crowdworkers based on the categorization. In an embodiment, the task manager 224 offers the one or more tasks to the at least one crowdworker through the communication manager 226. In an embodiment, the task manager 224 offers the one or more tasks such that a crowdworker receive the task only from one group from the one or more groups. For example, a first group has a first set of tasks and a second group has a second set of tasks. The task manager 224 offers the first set of tasks to a first set of crowdworkers and a second set of tasks to a second set of crowdworkers. Further, the task manager 224 makes sure that no task from the second set of tasks is offered to the first set of crowdworkers and vice versa. In an embodiment, the one or more tasks are offered based on the one or more security groups. For example, for the one or more tasks generated for the "General" security group, the one or more tasks are offered to one or more crowdworkers. In an embodiment, for the one or more tasks generated for the "Individual confidential" group, the one or more tasks are offered to in-house team.

Figure 4:
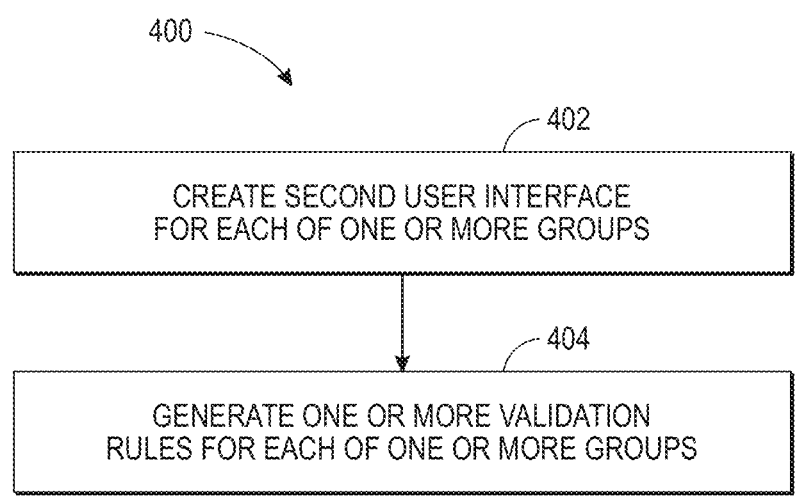
FIG. 4 is a flowchart illustrating a method for creating one or more task characteristics, in accordance with at least one embodiment.

FIG. 4 is a flowchart 400 illustrating a method for generating the one or more task characteristics (step 306), in accordance with at least one embodiment.

At step 402, the second user interface is created for each of the one or more groups based on the one or more same/similar characteristics associated with the each of the one or more groups. In an embodiment, the user interface manager 216 creates the second user interface. The user interface manager 216 extracts the one or more same/similar characteristics associated with each of the one or more groups. Based on the one or more same/similar characteristics, the user interface manager 216 creates the second user interface.

For example, the user interface manager 216 determines that for the "Group-1", the Data Entry Type is "Free Text" and the Syntactic Type is "Character". Thus for the name field, the user interface manager 216 will create a text box in which a crowdworker can input characters.

In an embodiment, the user interface manager 216 utilizes following rules to determine the input method:

TABLE 3

Various second user interface for the data entry type associated with the group.

| Data Entry Type | Second user interface |
|---|---|
| Free Text | Text Box |
| Multiple Choice | Drop Down Box |
| Selection-Single | Options Box |
| Selection-Multiple | Check Box |

For example, the Data Entry Type of the "Group-2" is "Multiple choice"; the user interface manager 216 may create a drop down box that includes all the options. In an alternate embodiment, the user interface manager 216 may create an options box for the "Multiple choice" data entry type. In an embodiment, the second user interface is stored as the user interface data 234.

Further, the user interface manager 216 generates the on screen instruction for the crowdworker to input data. In an embodiment, the user interface manager 216 utilizes the semantic type of the field, the data entry type of the field, and syntactic type of the field to frame the on screen instruction. For example, the semantic type, the data entry type, the syntactic type for "Group-1" are "Name", "Character", and "Free text" respectively. Thus, the user interface manager 216 would frame "Please enter the name shown in the image in the text box shown" as the on screen instruction. The user interface manager 216 collates the on screen instruction and the second user interface.

In an alternate embodiment, the requestor may modify the second user interface to modify the on screen instruction.

At step 404, the one or more validation rules are generated for each of the one or more groups based on the one or more same/similar characteristics associated with each of the one or more groups. In an embodiment, the validation module 228 generates the one or more validation rules. The validation module 228 extracts the one or more same/similar characteristics from the group data 236. For example, the validation module 228 generates the one or more validation rules from the "Semantic type", "Syntactic type" of the one or more groups (determined from the one or more same/similar characteristics associated with each of the one or more groups).

For example, for the "Group-1" the semantic type, syntactic type, and the data entry type are "Name", "Characters", and "Free text" respectively, the validation module 228 generates validation rule as "Not Null, Only Characters, and No special characters". The following table illustrates an example set of validation rules:

TABLE 4

Validation scripts corresponding to different semantic types, syntactic types and data entry types.

| Semantic type | Syntactic type | Data entry type | Validation rules |
|---|---|---|---|
| Name | Characters | Free text | Not Null, Only Characters, No special characters |
| Number | Numeric | Free text | Not Null, Only Numerals, No special characters |
| Language | Character | Multiple Choice | One of them is selected |

Additionally, the redundancy handler 229 defines a degree of redundancy for each of the one or more groups based on the one or more same/similar characteristics. In an embodiment, the redundancy handler 229 utilizes the "Security type" and the type of second user interface (refer Table 3) to define the degree of redundancy. In an embodiment, the degree of redundancy defines a number of crowdworkers that need to work on a task corresponding to the one or more categorized field.

For example, if security type of a group is "Individually confidential" and the type of second user interface is "Text box", the redundancy handler 229 would define a degree of redundancy as "5". Thus, fields in the "Individually confidential" group that has "text box" type interface associated, will be sent to five crowdworkers to enter data. As the "Individually confidential" group may include sensitive fields such as "SSN number", therefore it is necessary to have a consensus on the responses received for such fields. In addition, since the second user interface is the "text box", there is a high probability that the data inputted into the text box is error prone (because of typo errors or copying errors). Therefore, the degree of redundancy should be high so that maximum number of crowdworkers can validate the data inputted in the "text box". The redundancy module 229 may utilize similar rules to define degree of redundancy for each of the one or more fields.

Further, the redundancy handler 229 defines rules for correctness resolution based on the security type associated with the one or more fields and the second user interface associated with the one or more fields. In an embodiment, the redundancy handler 229 defines whether a consensus is required to determine correct response (i.e., all the responses should be same) or majority of the responses should be same to determine correct response. For example, "consensus" is defined as the correctness resolution is defined for a first field. Further, degree of redundancy for the first field is "5". Therefore, all the five responses (received from the five crowdworkers) should be same to consider the response as correct. In another example, "majority" is defined as the correctness resolution for a second field. Further, the degree of redundancy for the second field is "5". Therefore, at least three responses from the five responses should be same to consider the same responses as the correct response.

In alternate embodiment, the redundancy handler 229 defines a number of similar responses that are required to have a consensus on the particular response. For example, the redundancy handler 229 has defined that out of five responses for a task, minimum of four similar responses are required to consider the similar response as the correct response for the task. For instance, if the redundancy handler 229 receives three similar responses for the task, the redundancy handler 229 would reject all the responses for the task. Further, the task will be reassigned to the one or more crowdworkers until consensus is achieved for the field.

The following table illustrates example degree of redundancy and the correctness resolution for each of the one or more security types and the second user interface:

TABLE 5

Degree of redundancy corresponding to security types and input method type associated with field

| Security type | Second user interface | Degree of Redundancy | Correctness Resolution |
|---|---|---|---|
| General | Text Box | 3 | Majority |
| | Drop Down box | 3 | Majority |
| | Option Buttons | 2 | Consensus |
| | Check box | 2 | Consensus |
| Individually confidential | Text Box | 5 | Consensus |
| | Drop Down box | 3 | Majority |
| | Option Buttons | 2 | Consensus |
| | Check box | 2 | Consensus |
| Dependent confidential | Text Box | 5 | Majority |
| | Drop Down box | 2 | Consensus |
| | Option Buttons | 2 | Consensus |
| | Check box | 2 | Consensus |
| Restricted | Text Box | 5 | Majority |
| | Drop Down box | 2 | Consensus |
| | Option Buttons | 2 | Consensus |
| | Check box | 2 | Consensus |

A person having ordinary skill in the art would understand that degree of redundancy has been mentioned in table 5 for example purposes. In an embodiment, the degree of redundancy may vary based on the application and the type of task.

Figure 5:
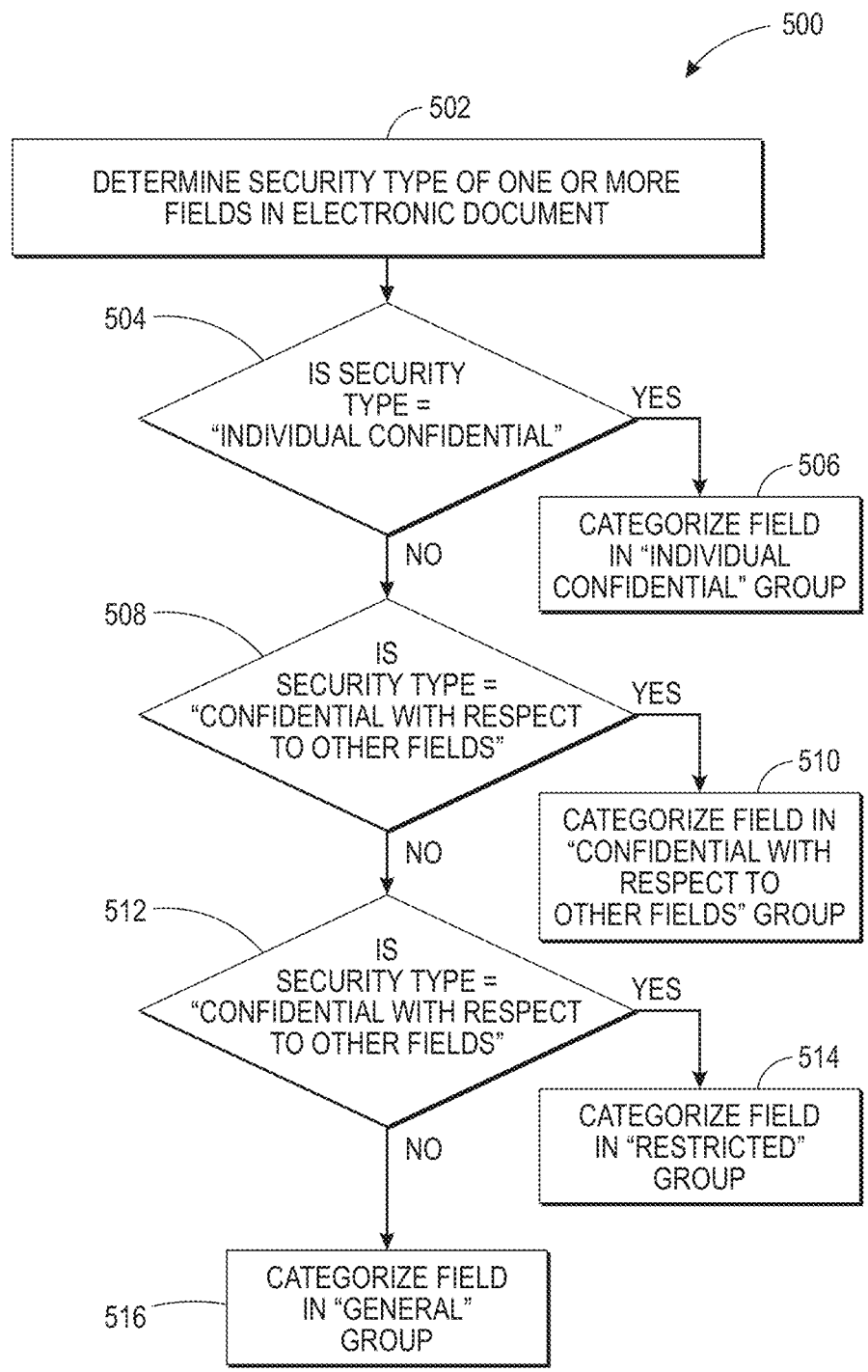
FIG. 5 is a flowchart illustrating a method for categorizing one or more fields in one or more security groups, in accordance with at least one embodiment.

FIG. 5 is a flowchart 500 illustrating a method for categorizing one or more fields in one or more security groups (as mentioned in step 304), in accordance with at least one embodiment.

At step 502, the security type of a field from the one or more fields is determined. In an embodiment, the categorization module 220 determines the security type from the group data 236.

At step 504, a check is performed whether the security type of the field is "Individual confidential". In an embodiment, the categorization module 220 performs the check. If at step 504 it is determined that the security type of the field is "Individual confidential", step 506 is performed. At step 506, the field is categorized under the "Individually confidential" group. If at step 504 it is determined that the security type of the field is not "Individually confidential", step 508 is performed.

At step 508, a check is performed whether the security type of the field is "Confidential with respect to other fields". In an embodiment, the categorization module 220 performs the check. If at step 508 it is determined that the security type of the field is "Confidential with respect to other fields", step 510 is performed. At step 510, the field is categorized under the "Confidential with respect to other fields" group. If at step 508 it is determined that the security type of the field is not "Confidential with respect to other fields", step 508 is performed.

At step 512, a check is performed whether the security type of the field is "Restricted". In an embodiment, the categorization module 220 performs the check. If at step 512 it is determined that the security type of the field is "Restricted", step 514 is performed. At step 514, the field is categorized under the "Restricted" group. If at step 512 it is determined that the security type of the field is not "Restricted", step 516 is performed. At step 516, the field is categorized under "General" category.

Steps 502 to 516 are repeated for each of the one or more fields.

Figure 6:
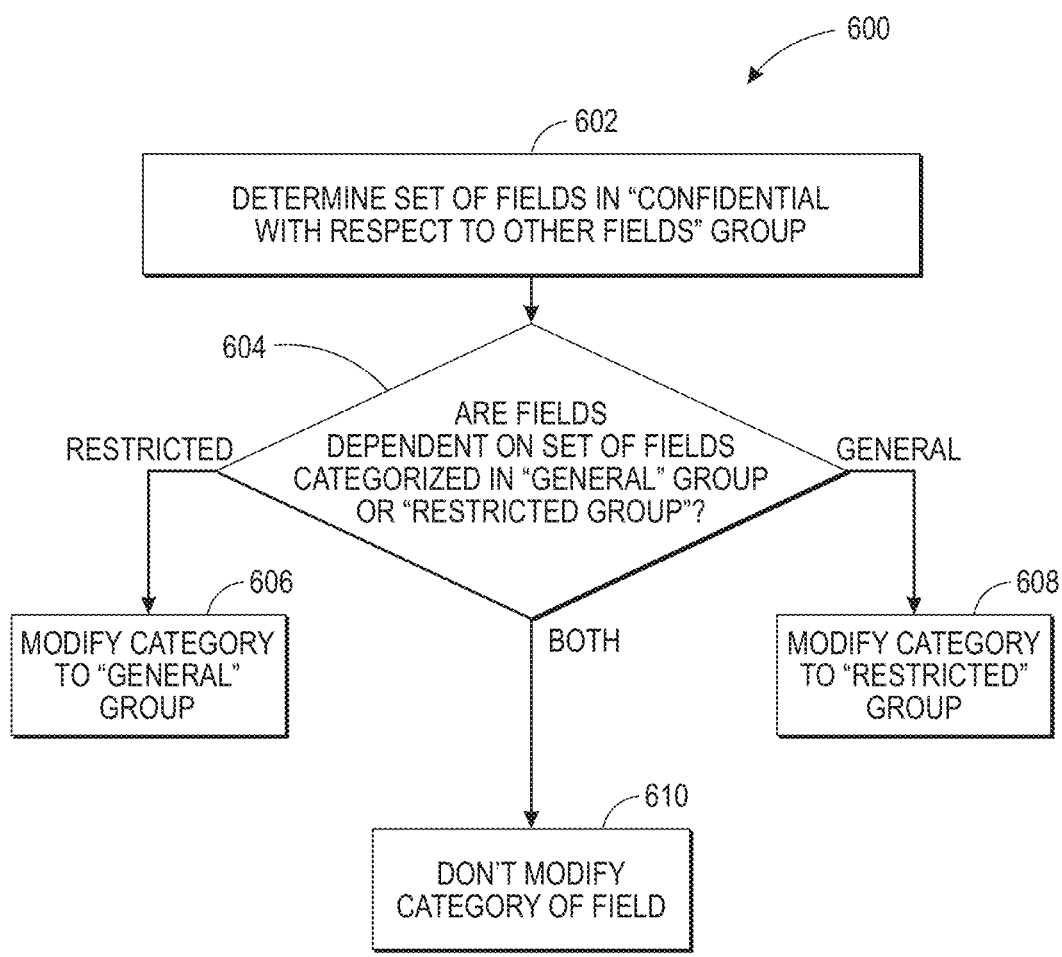
FIG. 6 is a flowchart illustrating another method for categorizing one or more fields in one or more security groups, in accordance with at least one embodiment.

FIG. 6 is a flowchart 600 illustrating another method of categorizing the one or more fields, in accordance with at least one embodiment.

At step 602, the set of fields in the "Confidential with respect to other fields" group is determined. In an embodiment, the categorization module 220 determines the set of fields. Further, the categorization module 220 determines a second set of fields from the one or more fields on which the set of fields are dependent on.

At step 604, a check is performed whether a field from the second set of fields is categorized under at least one of "Restricted" group or the "General" group. If at 604, it is determined that the field from the second set of fields has been categorized under "Restricted" group, step 606 is performed. At step 606, the category of the field is modified from "Restricted" group to the "General" group. If at 604, it is determined that the field from the second set of fields has been categorized under "General" group, step 608 is performed. At step 608, the category of the field is modified from "General" group to the "Restricted" group. If at step 604, it is determined that the field has been categorized in both "General" group and the "Restricted" group, the category of the field is not modified.

Steps 604-608 are repeated for each field in the second set of fields.

Figure 7:
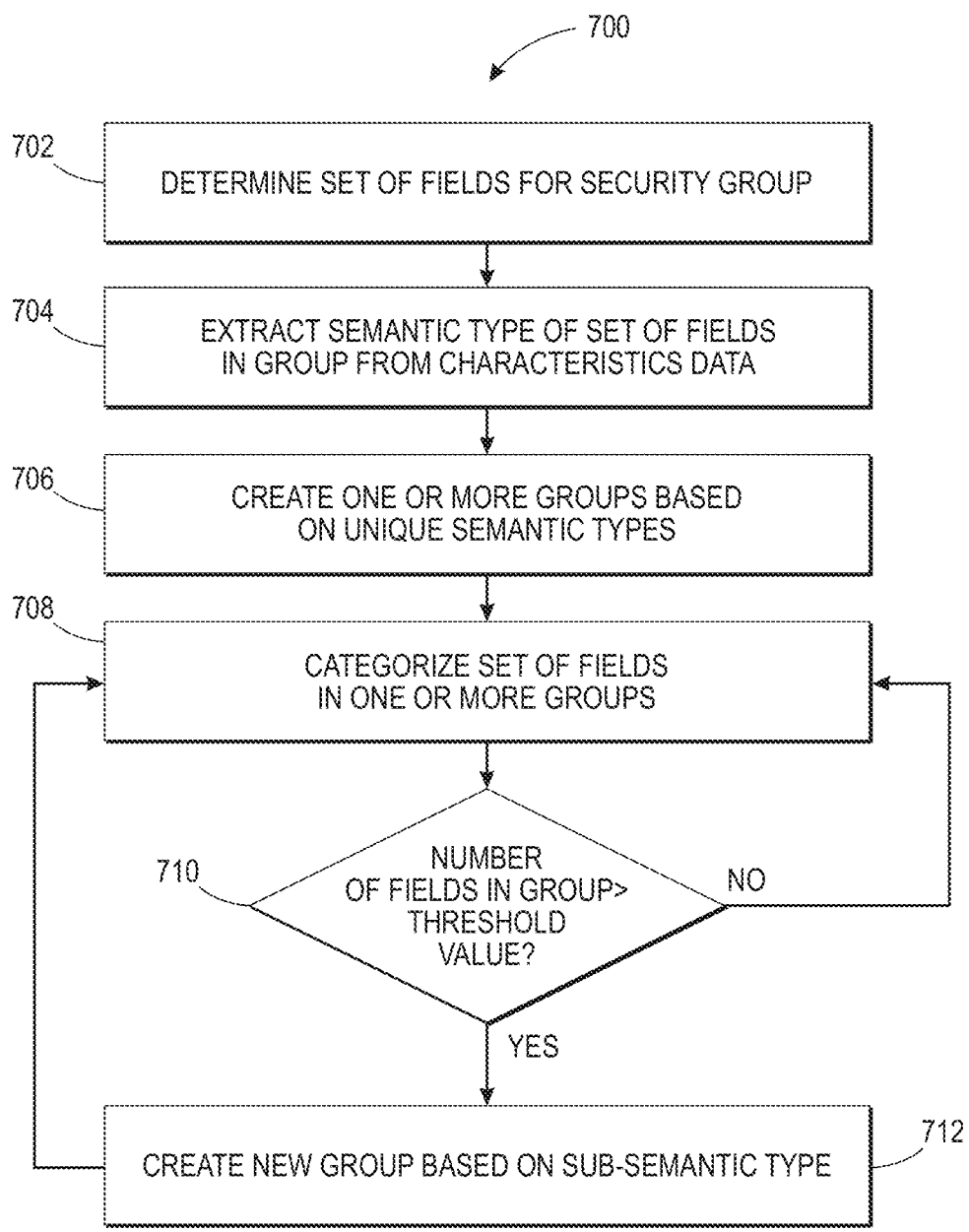
FIG. 7 is a flowchart illustrating a method of categorizing one or more fields in one or more groups, in accordance with at least one embodiment.

FIG. 7 is a flowchart 700 illustrating another method for categorizing the one or more fields, in accordance with at least one embodiment.

At step 702, a set of fields is determined for a security group from the one or more security groups. In an embodiment, the categorization module 220 determines the set of fields.

At step 704, for field in the set of fields a semantic type is extracted from the characteristics data 232. In an embodiment, the categorization module 220 extracts the semantic type associated with each field in the set of fields.

At step 706, one or more groups are created based on unique semantic types. In an embodiment, the categorization module 220 creates the one or more groups. For example, an electronic document includes the one or more fields having semantic type as "Date", "Name", and "Address". In such a scenario, the categorization module 220 creates a first group corresponding to "Date" semantic type, a second group corresponding to "Name" semantic type and a third group corresponding to "Address" semantic type.

At step 708, each field in the set of fields is categorized under the one or more groups based on the respective semantic types. In an embodiment, the categorization module 220 categorizes the set of fields. For example, "City" and "Name of person" have same semantic type that is "Name" semantic type. Thus, fields "City" and "Name of person" are categorized under the group corresponding to the "Name" semantic type.

At step 710, a check is performed whether a number of fields in a group from the one or more groups exceed a threshold value. In an embodiment, the categorization module 220 performs the check. If at step 710 it is observed that the number of fields in the group exceeds the threshold value, the step 712 is performed.

At step 712, a new group is created based on a sub-semantic type of the field. In an embodiment, the categorization module 220 creates the new group. For example, the number of fields in the group corresponding to the "Name" semantic type exceeds the threshold value. In such a scenario, the categorization module 220 may create a new group corresponding to the sub-semantic type such as "city" name. All the fields having "City" name as semantic type are categorized under the new group.

Steps 702-712 are repeated for each of the one or more security groups.

Figure 8:
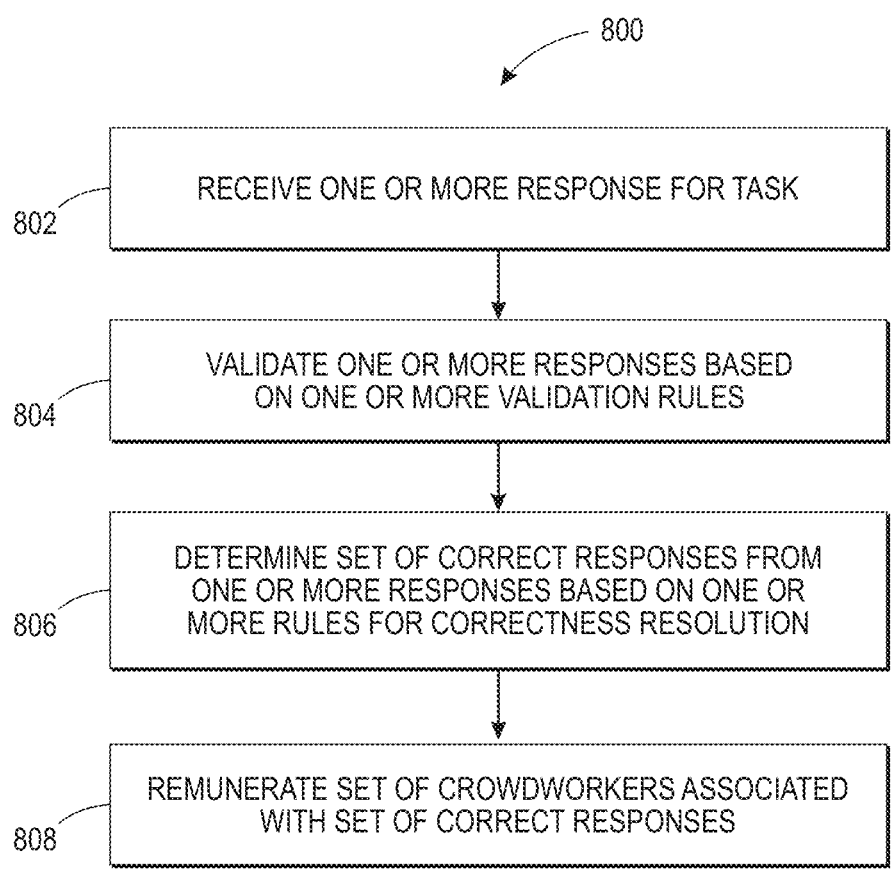
FIG. 8 is a flowchart illustrating a method of validating responses received from one or more crowdworkers, in accordance with at least one embodiment.

FIG. 8 is a flowchart 800 illustrating a method for validating responses received from the one or more crowdworkers, in accordance with at least one embodiment.

At step 802, one or more responses for a task are received from the one or more crowdworkers. In an embodiment, the communication manager 226 receives the one or more responses.

At step 804, the one or more responses are validated based on one or more validation rules (generated in step 314). In an embodiment, the validation module 228 validates the one or more responses. For example, the communication manager 226 receives a response for a "Name" semantic type as "ABC#". The validation module 228 utilizes a rule "Not Null, Only Characters, No special characters" (refer Table 4) to determine that the crowdworker has not entered that data correctly. In another example, the communication manager 226 receives a response for a "Number" semantic type as "1236". The validation module 228 utilizes a rule "Not Null, Only Numerals, No special characters" (refer Table 4) to determine that the crowdworker has entered correct data.

At step 806, determines a set of correct responses from the one or more responses received for a task based on the rules for correctness resolution (determined at step 314). In an embodiment, the redundancy handler 229 determines the set of correct responses.

At step 808, the set of crowdworkers that worked on the set of correct responses are remunerated. In an embodiment, the system 200 remunerates the set of crowdworkers.

FIGS. 9A, 9B, 9C, and 9D are snapshots of a first user interface 900, in accordance with at least one embodiment. The first user interface 900 is described in conjunction with FIGS. 3A and 3B.

Figure 9A:
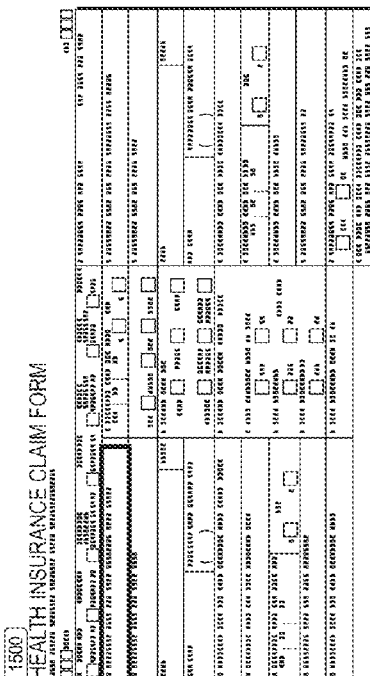

The first user interface 900 is presented to the requestor. In an embodiment, the first user interface 900 displays the electronic document 902 to the requestor. The requestor can select various operations to be performed on the electronic document 902. For example, the requestor can register the form (depicted by selecting an option 906), validate/modify grouping (depicted by selecting an option 908), validate/modify task characteristics (depicted by selecting an option 910), generate tasks (depicted by selecting an option 912), and crowdsource tasks (depicted by selecting an option 914). FIG. 9A depicts registration of the electronic document 902. An enclosure 904 depicts selection of a field from the one or more fields in the electronic document 902. A portion 916 is facilitates the requestor to define the one or more characteristics associated with the enclosed field. In an embodiment, the portion 916 appears when the requester selects/marks the field with the enclosure 904. In another embodiment, the portion 916 appears by right clicking or double clicking on the enclosure 904. In an embodiment, the coordinates of the enclosure 904 corresponds to the one or more location identifiers associated with the field.

Figure 9B:
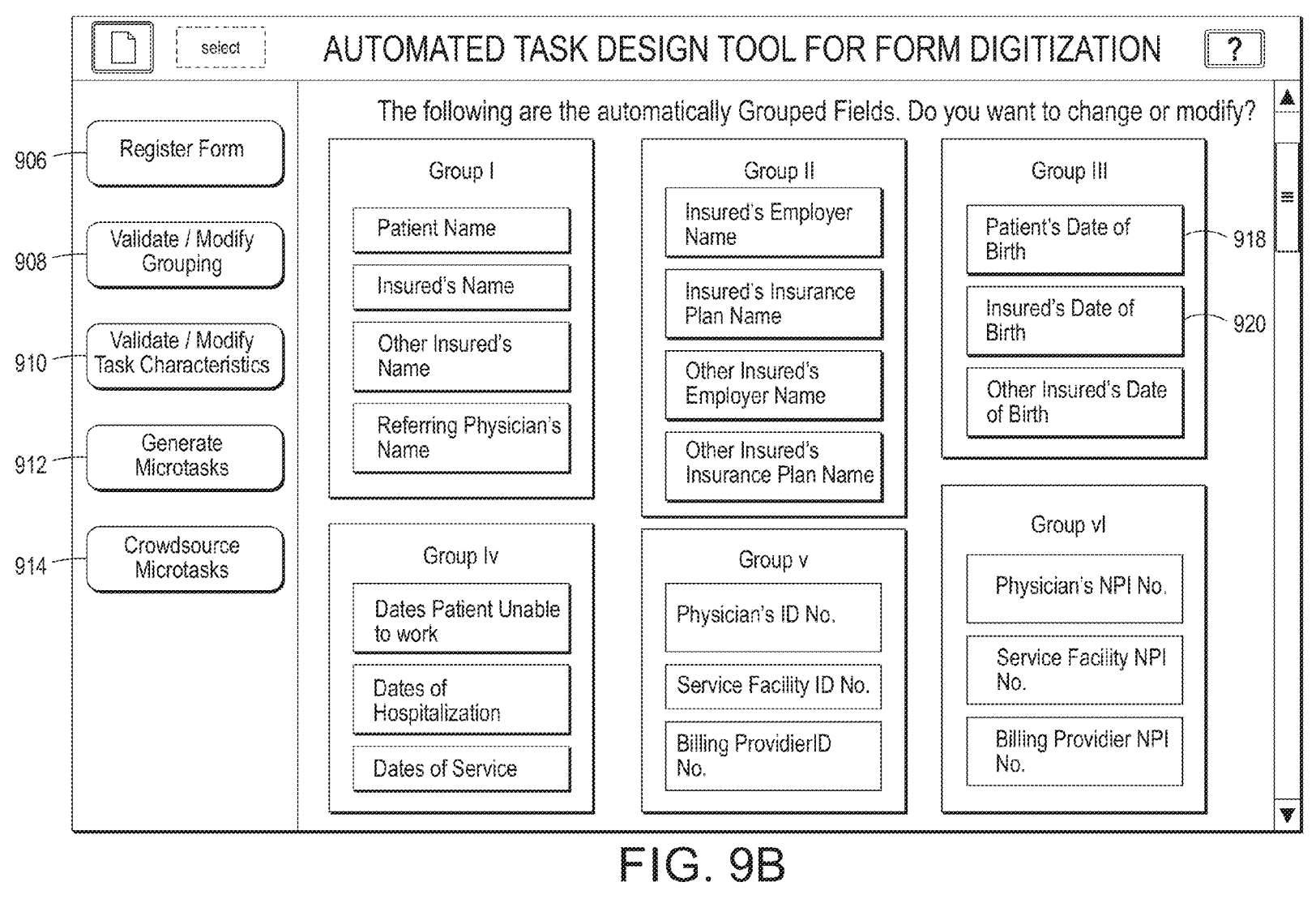

FIG. 9B illustrates the first user interface 900, where the requestor is presented with categorization of the one or more fields in the one or more groups. For example, "Group-III" (depicted by 918) includes a field "Insured date of birth"

(depicted by 920). In an embodiment, the requestor has an option to change the categorization of the one or more fields.

Figure 9C:
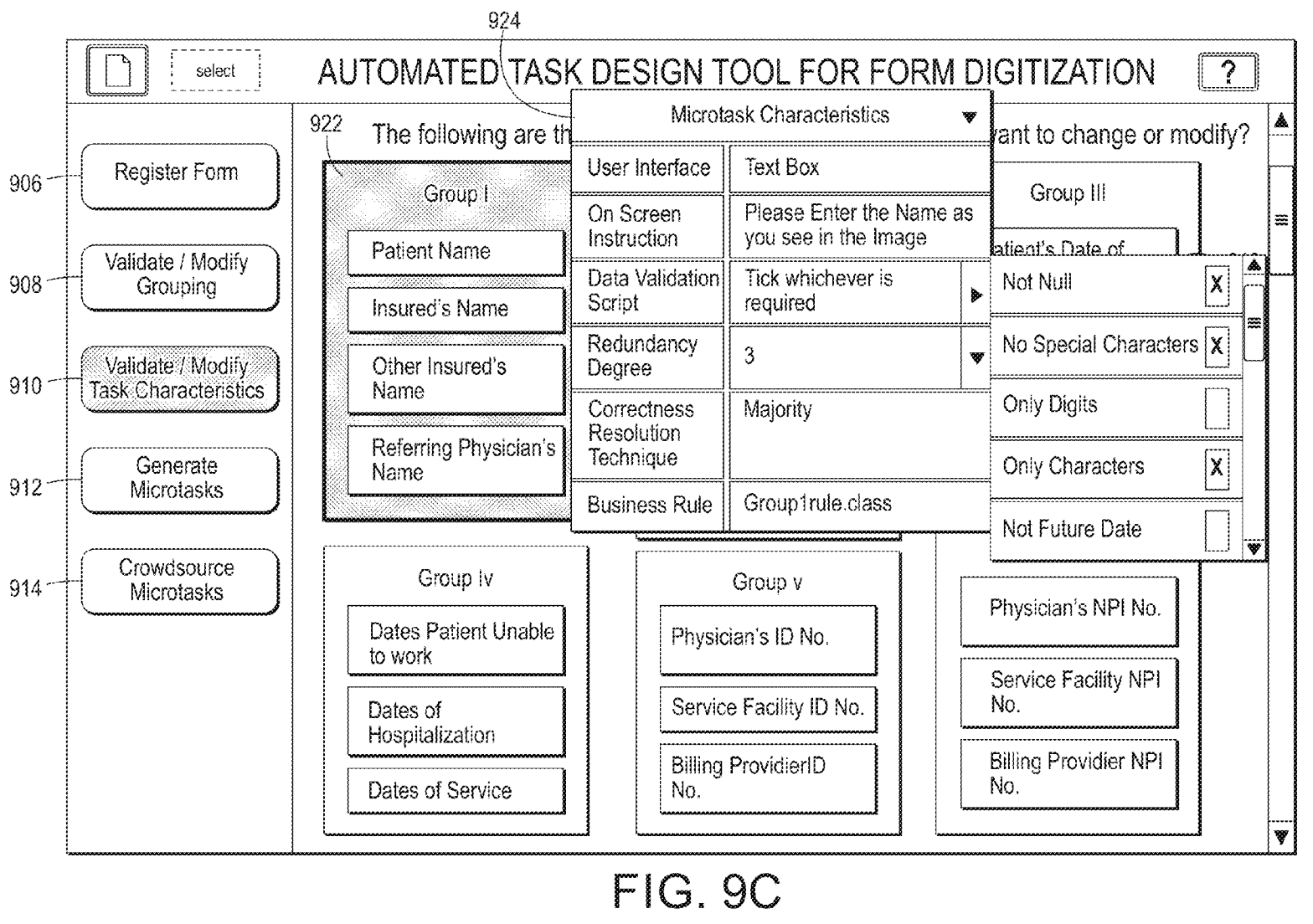

FIG. 9C illustrates validation of the tasks characteristics for each of the one or more groups. For example, for "Group-1" (depicted by 922) a window 924 depicts the task characteristics. In an embodiment, the task characteristics include type of second user interface (created in step 312), on screen instruction (generated in step 312), data validation rules (generated in step 314), degree of redundancy, and correction resolution technique. In an embodiment, the requestor may change the task characteristics.

Figure 9D:
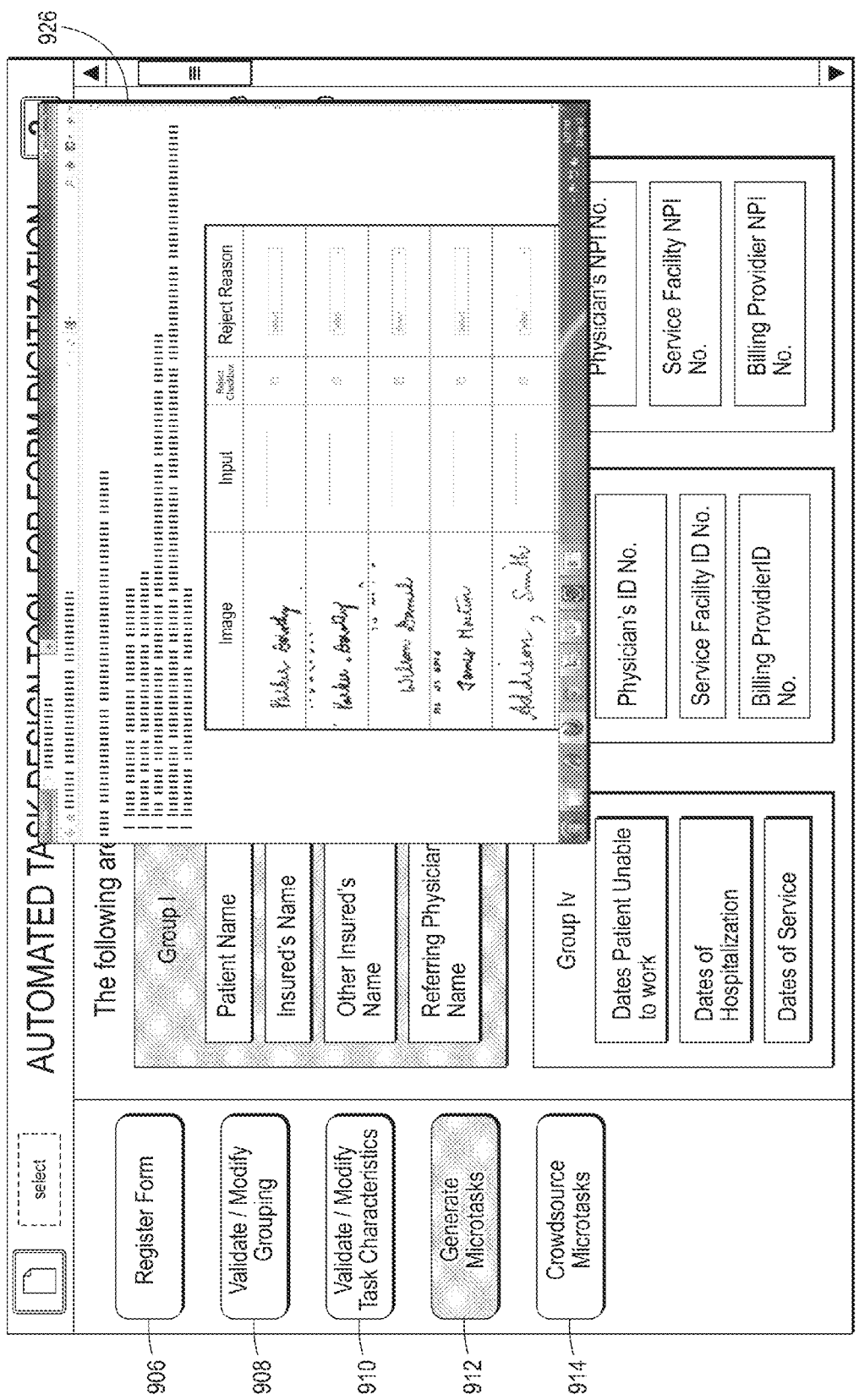

FIG. 9D presents a sample second user interface 926 (e.g., preview of task) to the requestor. The requestor may validate the second user interface.

The disclosed embodiments encompass numerous advantages. The electronic document includes one or more fields that are categorized in the one or more groups based on the one or more characteristics associated with the one or more fields. Each group in the one or more groups has one or more associated task characteristics. The one or more task characteristics determine the characteristics of the one or more tasks created for the each group. In an embodiment, each of the one or more tasks has same task characteristics. As a crowdworker is presented with the one or more tasks from a single group and each of the one or more tasks has same task characteristics, the crowdworker may find it easy to complete the one or more tasks. Further, as the tasks from other groups are not presented to the same crowdworker, the privacy concern associated with disclosure of the information is minimized.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for creating tasks of digitizing electronic document have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method implementable on a computing device for creating one or more tasks of digitizing an electronic document, the method comprising:
    receiving inputs to define one or more characteristics associated with each of one or more fields in the electronic document, the one or more characteristics comprising at least a security type associated with the one or more fields, a data entry type associated with the one or more fields, redundancy rules for the one or more fields, and resolution rules for one or more fields, wherein
        the redundancy rules and the resolution rules for a given field are based on the data entry type and the security type for the given field, and
        fields of a predetermined security type and a free text data entry type are assigned consensus resolution based on a confidentiality indicated by the predetermined security type and an error risk indicated by the free text data entry type;
    categorizing the one or more fields in one or more groups based on at least the security type associated with the one or more fields; and
    creating a task for the one or more categorized fields based on the one or more characteristics associated with the one or more categorized fields;
    sending the created tasks to a set of remote workers such that a first subset of the set of remote workers that are sent tasks categorized in a first group are not sent tasks categorized in a second group based on the security type for the fields of at least one of the first group or the second group indicating that remote workers are not to be sent data associated with fields of the first group and also sent data associated with fields of the second group, wherein
        the tasks are presented through a user interface based on the categorization for the fields associated with the tasks such that a remote worker inputs a response to the tasks using the user interface in accordance with a data entry type for the fields corresponding to the tasks,
        ones of tasks associated with a particular data filed categorized in the first group are sent to a number of remote workers from among the first subset of remote workers such that responses from the number of remote workers are assessed in accordance with the resolution rules for the particular field, the number of remote workers from among the first subset being based on the redundancy rules for the particular field,
        the method is performed by a processor in the computing device.

2. The method of claim 1 further comprising receiving an input to define identifiers corresponding to the one or more fields.

3. The method of claim 1, further comprising determining one or more location identifiers for the one or more fields in the electronic document, wherein a portion corresponding to the one or more location identifiers is extracted from a filled electronic document.

4. The method of claim 3, wherein the user interface comprises the extracted portion from the filled electronic document.

5. The method of claim 1 further comprising generating the user interface for the one or more categorized fields in the one or more groups based on the one or more characteristics, wherein the user interface comprises at least one of a text box, a drop-down menu, a checkbox, an option button, or one or more screen instructions for data entry.

6. The method of claim 1, further comprising receiving the response for the task from the at least one remote worker and validating the received response based on the one or more characteristics.

7. The method of claim 1, wherein the one or more characteristics further comprise a syntactic type associated with the one or more fields, a semantic type associated with the one or more fields, a granularity type associated with the one or more fields, a field data entry type associated with the one or more fields, and a dependency type associated with the one or more fields.

8. The method of claim 7, wherein the one or more fields are categorized in one or more security groups based on at least one of the security type or the dependency type associated with each of the one or more fields such that the one or more security groups comprises a set of fields.

9. The method of claim 8, wherein each field in the set of fields in the one or more security groups is categorized in the one or more groups based on the semantic type of field in the set of fields.

10. The method of claim 9, further comprising creating a new group based on a sub-sematic type of at least a field in the first set of fields, when a number of fields in the first set of fields exceeds a predetermined threshold value.

11. The method of claim 1, wherein the resolution rules define one of majority or consensus resolution such that fields of a predetermined security type are assigned consensus resolution based on a confidentiality indicated by the predetermined security type.

12. The method of claim 11, wherein
    the particular field comprises the predetermined security type and the free text data entry type, such that responses received from the number of remote workers sent the ones of tasks associated with the particular field do not satisfy consensus resolution, and
    additional tasks associated with the particular field are sent to a second number of remote workers from among the first subset of remote workers different from the remote workers that were previously sent the ones of tasks, the second number of remote workers from among the first subset being based on the redundancy rules for the particular field.

13. A system for creating one or more tasks of digitizing an electronic document, the system comprising:
    one or more processors configured to:
        register the electronic document by receiving inputs to define one or more characteristics associated with each of the one or more fields, the one or more characteristics comprising at least a security type associated with the one or more fields, a data entry type associated with the one or more fields, redundancy rules for the one or more fields, and resolution rules for one or more fields, wherein
            the redundancy rules and the resolution rules for a given field are based on the data entry type and the security type for the given field, and
            fields of a predetermined security type and a free text data entry type are assigned consensus resolution based on a confidentiality indicated by the predetermined security type and an error risk indicated by the free text data entry type;

categorize the one or more fields in one or more groups based on at least the security type associated with the one or more fields;

generate a user interface for the one or more groups based on the one or more characteristics associated with the one or more categorized fields in the one or more groups; and create a task for the one or more categorized fields on the corresponding user interface and the one or more characteristics associated with the one or more categorized fields;

send the created tasks to a set of remote workers such that a first subset of the set of remote workers that are sent tasks categorized in a first group are not sent tasks categorized in a second group based on based on the security type for the fields of at least one of the first group or the second group indicating that remote workers are not to be sent data associated with fields of the first group and also sent data associated with fields of the second group, wherein the tasks are presented through the user interface, and ones of tasks associated with a particular data filed categorized in the first group are sent to a number of remote workers from among the first subset of remote workers such that responses from the number of remote workers are assessed in accordance with the resolution rules for the particular field, the number of remote workers from among the first subset being based on the redundancy rules for the particular field.

14. The system of claim 13, wherein the one or more processors are further configured to determine one or more location identifiers in the electronic document for the one or more fields.

15. The system of claim 14, wherein the one or more processors are further configured to extract a portion from a filled electronic document corresponding to the one or more location identifiers in the electronic document.

16. The system of claim 15, wherein the user interface comprises the portion from the filled electronic document.

17. The system of claim 13, wherein the one or more processors are further configured to generate one or more validation rules for created tasks based on the one or more characteristics of the fields associated with the created tasks, wherein received response for the tasks are validated based on the one or more validation rules.

18. The system of claim 13, wherein the one or more characteristics further comprise at least a syntactic type associated with the one or more fields, a semantic type associated with the one or more fields, a granularity type associated with the one or more fields, a field data entry type associated with the one or more fields, and a dependency type associated with the one or more fields.

19. A computer program product for use with a computer, the computer program product comprising a non-transitory computer readable medium, wherein the non-transitory computer readable medium stores a computer program code for creating one or more tasks of digitizing an electronic document, wherein the computer program code is executable by one or more processors to:

receive inputs to define one or more characteristics associated with each of the one or more fields, the one or more characteristics comprising at least a security type associated with the one or more fields, a data entry type associated with the one or more fields, redundancy rules for the one or more fields, and resolution rules for one or more fields, wherein the redundancy rules and the resolution rules for a given field are based on the data entry type and the security type for the given field, and fields of a predetermined security type and a free text data entry type are assigned consensus resolution based on a confidentiality indicated by the predetermined security type and an error risk indicated by the free text data entry type;

categorize the one or more fields in more or more groups based on the security type associated with the one or more fields;

create a task for the one or more categorized fields based on the one or more characteristics associated with the one or more categorized fields in the one or more groups;

send the created tasks to a set of remote workers such that a first subset of the set of remote workers that are sent tasks categorized in a first group are not sent tasks categorized in a second group based on the security type for the fields of at least one of the first group or the second group indicating that remote workers are not to be sent data associated with fields of the first group and also sent sent data associated with fields of the second group, wherein the tasks are presented through a user interface based on the categorization for the fields associated with the tasks such that a remote worker inputs a response to the tasks using the user interface in accordance with a data entry type for the fields corresponding to the tasks, and ones of tasks associated with a particular data filed categorized in the first group are sent to a number of remote workers from among the first subset of remote workers such that responses from the number of remote workers are assessed in accordance with the resolution rules for the particular field, the number of remote workers from among the first subset being based on the redundancy rules for the particular field.

* * * * *